UNITED STATES PATENT OFFICE.

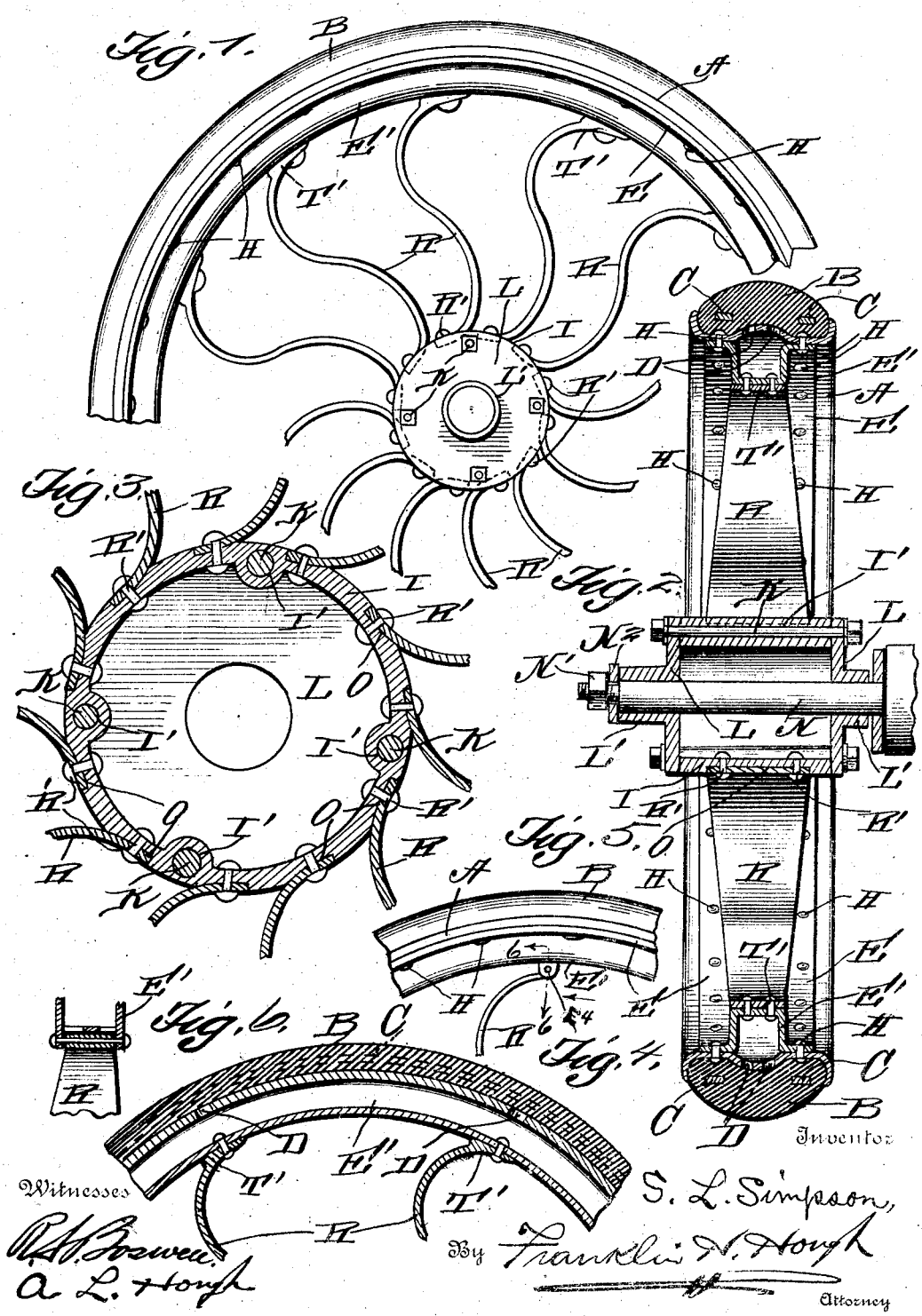

SELDEN L. SIMPSON, OF WASHINGTON, DISTRICT OF COLUMBIA, ASSIGNOR TO THE SIMPSON SPECIALTY COMPANY, OF CLEVELAND, OHIO, A CORPORATION OF OHIO.

VEHICLE-WHEEL.

976,938.  Specification of Letters Patent.  Patented Nov. 29, 1910.

Application filed June 7, 1909. Serial No. 500,943.

*To all whom it may concern:*

Be it known that I, SELDEN L. SIMPSON, a citizen of the United States, residing at Washington, in the District of Columbia, have invented certain new and useful Improvements in Vehicle-Wheels; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in wheels for automobiles and other vehicles and comprises a simple and efficient construction of a wheel having a series of resilient spokes designed to take up vibration and thus dispense with the use of pneumatic tires.

The invention comprises various details of construction and combinations and arrangements of parts which will be hereinafter fully described and then specifically defined in the appended claim.

My invention is illustrated in the accompanying drawings, in which:—

Figure 1 is a side elevation of a wheel made in accordance with my invention. Fig. 2 is a vertical sectional view through the same. Fig. 3 is a transverse view through the hub portion of the wheel. Fig. 4 is a central longitudinal sectional view through a portion of a tire and rim. Fig. 5 is a detail view of a slight modification and Fig. 6 is a cross-sectional view through a portion of the rim showing a face view of a portion of one of the spokes.

Reference now being had to the details of the drawings by letter, A designates the rim of the wheel, made preferably of metal or of any other suitable material if desired, of the general shape shown in cross section in Fig. 2, in which a grooved portion thereof is adapted to receive a tire B which may be solid and preferably cushioned and held in place by means of straps C passed circumferentially through slots formed in the tire and forming means whereby the tire may be clamped to the rim.

Fixed to the inner circumference of the rim, which latter is provided with apertures D for the insertion of bolts, is a reinforcing rim E made circular in outline and having the inwardly projecting portion E' which is substantially U-shaped in cross section, and provided with a series of apertures for the reception of the rivets H. The hub portion of the wheel consists of the cylindrical part I, having a series of transverse apertures I' formed therein for the reception of the bolts K, and L designates the hub sections which are provided with apertures adapted to register with the apertures in the cylindrical portion of the hub and for the reception of the bolts K. Said sections having contracted projecting flanges L' for the reception of the spindle N of the vehicle and to which spindle a nut N' is fitted adapted to bear against a washer $N^2$ placed intermediate the nut and the end of the hub flange L'. The circumference of the cylindrical shell I is recessed at intervals, designated by letter O and shown clearly in Fig. 3 of the drawings each recess terminating in a shoulder, and R designates resilient spokes, substantially S-shaped, the inner end of each being seated in one of said recesses in the shell. R' designates rivets which are passed through apertures in the ends of said spokes which seat in said recesses and also pass through the shell, as shown clearly in the drawings. Each outer end of the spoke is provided with elongated bearing surface T' adapted to bear against the projecting portion E' of the rim E and held thereto in any suitable manner. As the space between the opposite walls of the U-shaped portion of the rim E is closed when fastened to the rim, the apertures D are provided through which the rivets may be passed to be conveniently inserted through apertures in the rim E and the ends of the spokes.

In Fig. 5 of the drawings, I have shown a slight modification of my invention in which the outer end of each spoke R is pivoted between ears $E^4$ provided at suitable intervals upon the inner periphery of the rim E; thus affording means whereby the outer ends of each spoke may have a tilting movement upon the pin rather than to be held rigid as shown in the other views of the drawings.

It will be noted that the hollow shell or cylindrical portion of the hub is of considerable diameter and provided so for the purpose of placing a clutch of modern construction therein and which will be adjacent to the body of the vehicle, thus dispensing with the present manner of bolting the clutch to the outer surface of the wheel, and when the clutch mechanism is so located, it will be hidden from view and protected from the elements.

By the provision of an apparatus as shown and described, it will be noted that a simple and efficient means is afforded for taking up vibration and dispensing with the usual pneumatic tires, the various parts of the wheel as constructed being thoroughly reinforced and so constructed that the various spokes may be interchanged, if desired, and access readily had to the interior of the hollow cylindrical shell.

What I claim to be new is:—

A vehicle wheel having a grooved rim with a central circumferential portion which is convexed, a hollow circular outlined member having its opposite edges outwardly bent and in the same plane, fastening means engaging the edges of said member to the inner surface of the grooved portion of the rim upon either side of the central convexed part, a hub, series of spokes having their inner ends secured to said hub, the outer ends of the spokes engaging the inner periphery of said member and having its opposite edges flush with the opposite sides of the member, and means for fastening the latter and said spokes together.

In testimony whereof I hereunto affix my signature in the presence of two witnesses.

SELDEN L. SIMPSON.

Witnesses:
  FRANKLIN H. HOYT,
  J. W. SHERWOOD.